United States Patent
Lee et al.

(10) Patent No.: US 12,333,968 B2
(45) Date of Patent: Jun. 17, 2025

(54) DISPLAY DEVICE

(71) Applicant: LG ELECTRONICS INC., Seoul (KR)

(72) Inventors: Sungwhan Lee, Seoul (KR); Taeho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/713,576

(22) PCT Filed: Nov. 26, 2021

(86) PCT No.: PCT/KR2021/017630
§ 371 (c)(1),
(2) Date: May 24, 2024

(87) PCT Pub. No.: WO2023/095961
PCT Pub. Date: Jun. 1, 2023

(65) Prior Publication Data
US 2025/0029524 A1   Jan. 23, 2025

(51) Int. Cl.
*G09G 3/00* (2006.01)
*G02B 30/56* (2020.01)

(52) U.S. Cl.
CPC .............. *G09G 3/001* (2013.01); *G02B 30/56* (2020.01); *G09G 2320/02* (2013.01); *G09G 2360/14* (2013.01)

(58) Field of Classification Search
CPC .............. G09G 3/001; G09G 2320/02; G09G 2360/14; G02B 30/54; G02B 30/56

USPC ........................................................... 345/31
See application file for complete search history.

(56) References Cited

U.S. PATENT DOCUMENTS

| 4,987,301 | A | * | 1/1991 | Nakamura | ............... | G01D 5/36 |
|---|---|---|---|---|---|---|
| | | | | | | 369/44.37 |
| 2006/0169827 | A1 | * | 8/2006 | Lewis | ................... | A47K 10/36 |
| | | | | | | 242/563 |
| 2017/0124925 | A1 | | 5/2017 | Chykeyuk et al. | | |
| 2021/0045191 | A1 | | 2/2021 | Hsieh | | |

FOREIGN PATENT DOCUMENTS

| KR | 10-2014-0013721 A | | 2/2014 | | |
|---|---|---|---|---|---|
| KR | 10-2016-0106441 A | | 9/2016 | | |
| KR | 10-1839116 B1 | | 3/2018 | | |
| KR | 10-2018-0090171 A | | 8/2018 | | |
| KR | 2018090171 A | * | 8/2018 | ............. | G09F 11/04 |
| KR | 10-2020797 B1 | | 9/2019 | | |

* cited by examiner

*Primary Examiner* — Mark Edwards
(74) *Attorney, Agent, or Firm* — Birch, Stewart, Kolasch & Birch, LLP (57) ABSTRACT

The present disclosure is to provide a structure for improving the image quality of a rotary display device by using an afterimage effect of a light source, comprising: a fixed module comprising a motor; a rotary module which comprises a plurality of LED bars having a plurality of LEDs mounted thereon, and is rotated by the motor; a control unit which controls the plurality of LED bars to output an image; and a location detection part that detects the locations of the plurality of LEDs according to rotation, wherein the control unit may output the image by synchronizing pixel output locations with the locations of the plurality of LEDs detected by the location detection part.

10 Claims, 7 Drawing Sheets

DISPLAY DEVICE

CROSS REFERENCE TO RELATED APPLICATION

This application is the National Phase of PCT International Application No. PCT/KR2021/017630, filed on Nov. 26, 2021, which is hereby expressly incorporated by reference into the present application.

TECHNICAL FIELD

The present disclosure relates to a display device and a method of operating the same, and more specifically, to a display device that implements a floating image through afterimage display technology and a method of operating the same.

BACKGROUND

POV (Persistence Of Vision) refers to a visual effect in which the image does not disappear for a certain period of time even after the image disappears.

A display device using POV includes a motor that rotates at high speed and a bar or plate connected to the motor, and a light source such as a light emitting diode is installed in the bar or plate. Accordingly, the display device can output a floating image as if floating in space by emitting LEDs while the bar or plate rotates at high speed by a motor. In other words, a display device can implement an image with a floating feel with high transmittance by expressing an image in the form of a plane by rotating a line-shaped light source using the afterimage effect of the retina without a screen.

To implement a high-quality display, such a display device must rotate a rotation module where the light source is located at hundreds of rev/min or more, and since the timing is set at the location corresponding to each pixel and the pixels of the light source must blink, signal control of the image output according to the rotation speed is very important.

Conventionally, a reference location is selected by installing an infrared sensor, a Hall sensor, etc. between the rotation module and the fixing module, and the image output signal was controlled by detecting the rotation speed using a signal generated each time the rotation module rotates. However, in this case, since there is a difference between the actual location where pixels should be output and the predicted location using the sensor signal there is a problem where the screen appears to tremble due to a change in the location of the pixel output each rotation.

SUMMARY

The present disclosure is to provide a structure for improving the image quality of a rotating display device using the afterimage effect of a light source.

The present disclosure is to provide a display device that outputs images by minimizing an error between an actual location where pixels should be output and a predicted location through a sensor, and a method of operating the same.

The present disclosure is to provide a display device that minimizes prediction errors in pixel output locations due to deviations in motor speed, and a method of operating the same.

A display device may include a fixing module including a motor; a rotation module including a plurality of LED bars equipped with a plurality of LEDs and rotated by the motor; a control unit configured to control the plurality of LED bars to output images; and a location detecting unit configured to detect locations of the plurality of LEDs according to the rotation, wherein the control unit is configured to output the images by synchronizing pixel output locations with the detected locations of the plurality of LEDs through the location detecting unit.

The location detecting unit may include a reading unit, and a scale unit having an object to be recognized by the reading unit, wherein the reading unit and the scale unit are installed separately.

The location detecting unit may include a scale unit installed on the fixing module, a reading unit configured to recognize the scale unit and installed in the rotation module.

A plurality of slits may be formed in the scale unit, and wherein the reading unit may be configured to recognize a light that has passed through any one of the plurality of slits.

A plurality of slits may be formed on the scale unit, and wherein the reading unit may be configured to recognize a light reflected from a bridge between the slits.

The number of slits may be equal to the horizontal number of the image resolution.

The number of slits may be one more than the horizontal number of the image resolution.

A marker may be engraved on the scale unit, and wherein the reading unit may include a laser sensor that recognizes the marker.

The scale unit may be disposed on an outer periphery of at least a portion of the fixing module.

The scale unit may be installed along an outer circumference of the motor among the fixing modules.

The control unit may be installed in the rotation module together with the reading unit.

The display device may further include a communication unit configured to transmit a result of the recognition by the reading unit to the control unit when the reading unit is installed in the fixing module and the scale unit is installed in the rotation module.

The control unit may be configured to receive location information of the locations of the plurality of LEDs from the location detecting unit.

The control unit may be configured to calculate absolute locations of the plurality of LEDs and synchronize to the pixel output locations based on the calculated absolute locations.

The control unit may include a memory control unit configured to acquire an input image frame, a timing control unit configured to obtain output timing of the input image frame, an image signal processing unit configured to process a signal so that the input image frame is output at the output timing, and an LED bar control unit configured to control the plurality of LEDs to output light according to the signal processing, wherein the LED bar control unit may be configured to receive a signal for synchronizing pixel output locations with the locations of the plurality of LEDs from the location detecting unit.

According to an embodiment of the present disclosure, since pixel output location is synchronized by detecting multiple LED locations, it is possible to output a light according to the image data accurately at the pixel output location regardless of the speed deviation of the motor, thereby improving the image quality and minimizing image shaking.

According to an embodiment of the present disclosure, the scale unit is installed in a fixing module and the reading unit is installed in a rotation module, so the recognition result of the reading unit is directly transmitted to an LED bar control unit, thereby performing a synchronization for the pixel output location more accurately and quickly.

According to an embodiment of the present disclosure, since the number of slits is equal to or one more than the horizontal number of the image resolution, the LED can be matched to each pixel and the reference location can be recognized, thereby being capable of accurately s

DETAILED DESCRIPTION OF THE EMBODIMENTS

Hereinafter, embodiments related to the present invention will be described in more detail with reference to the drawings. The suffixes "module" and "part" for components used in the following description are given or used interchangeably only for the ease of preparing the specification, and do not have distinct meanings or roles in themselves.

Figure 1:
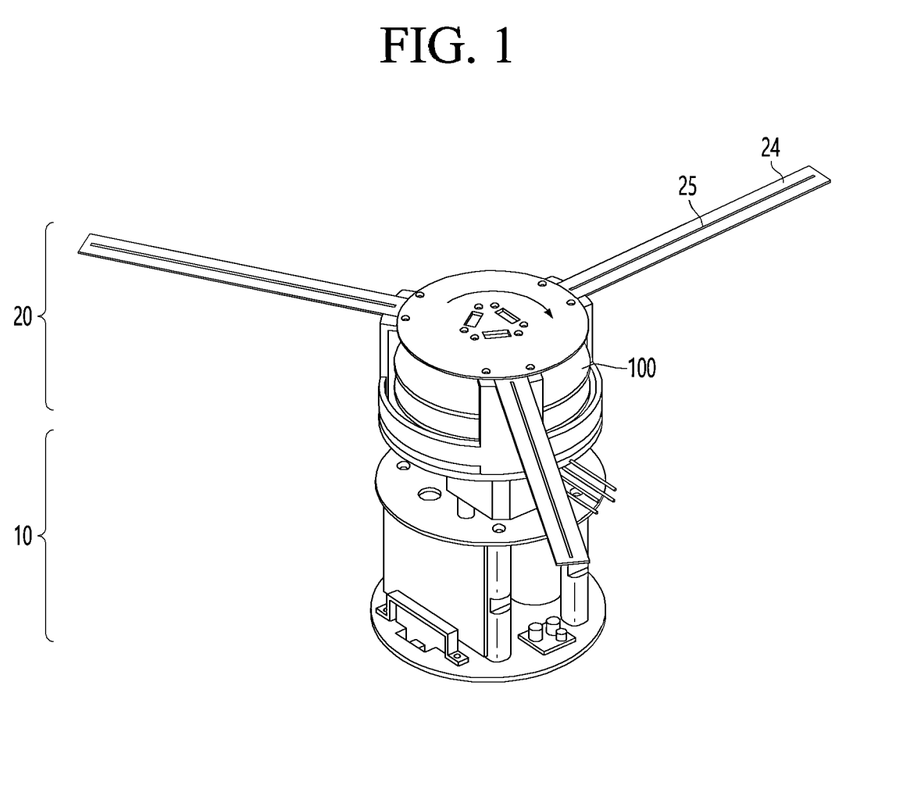
FIG. 1 is a perspective view of a circular display unit of a display device according to an embodiment of the present disclosure.
Figure 2:
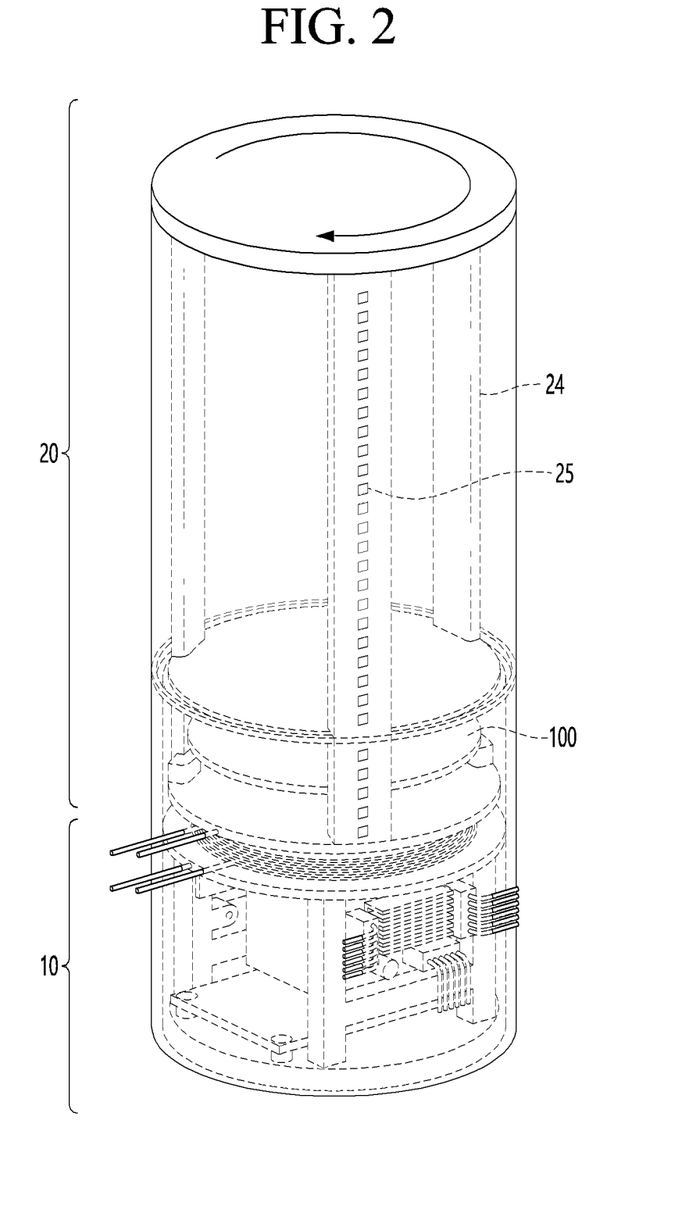
FIG. 2 is a perspective view of a cylindrical display unit of a display device according to an embodiment of the present disclosure.

FIG. 1 is a perspective view of a circular display unit of a display device and FIG. 2 is a perspective view of a cylindrical display unit of a display device according to an embodiment of the present disclosure.

As shown in FIG. 1, the display device according to an embodiment of the present disclosure includes a fixing module 10 and a rotation module 20. The fixing module 10 does not rotate while the image is output, and the rotation module 20 rotates while the image is output.

FIGS. 1 and 2 illustrate the configuration for explaining the present disclosure, but the embodiments can include other configurations. For example, not shown in FIGS. 1 and 2, the display device can further include a case to support or protect internal elements.

The fixing module 10 can include at least part or all of a motor 23 (see FIG. 4) for rotating the rotation module 20 and a power supply unit that receives and supplies power from an outside.

Figure 3:
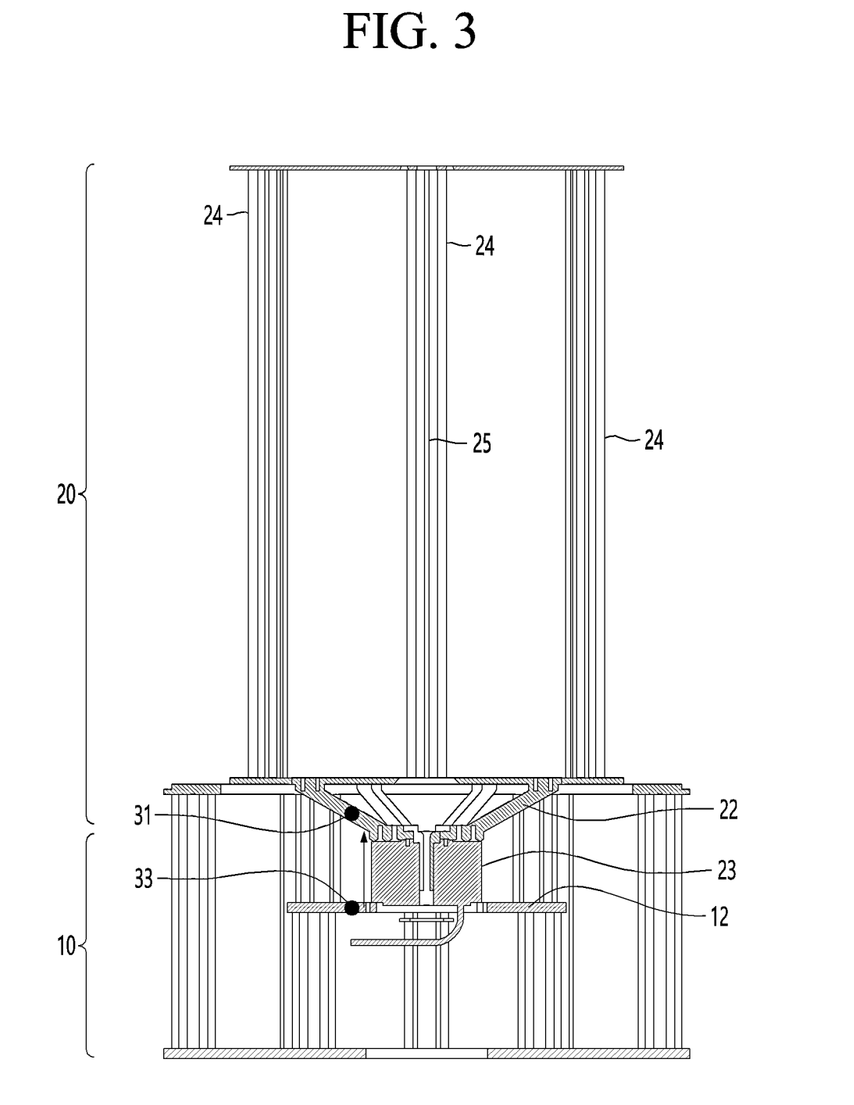
FIG. 3 is a diagram illustrating a sensor for detecting a rotation speed in a conventional display device.

The motor 23 can receive power and generate rotational force as it rotates, and this rotational force can be transmitted to a rotation module 20 through the power transmission member 22 (see FIG. 3). The power transmission member 22 can be omitted depending on the embodiment. That is, the rotation module 20 can directly receive the rotational force of the motor 23.

The rotation module 20 can rotate by receiving the rotational force generated by the motor 23. The rotation module 20 can rotate approximately 60 times per second, but this is only an example and is not limited thereto.

As shown in FIG. 3, the rotation module 20 can be provided with a main control board 100. The main control board 100 can be equipped with various elements for driving the rotation module 20 and outputting images.

As shown in FIGS. 1-3 rotation module 20 can include a plurality of LED bars 24 on which a plurality of LEDs 25 is mounted.

In each LED bar 24, a plurality of LEDs 25 can be mounted along a line. The plurality of LEDs 25 mounted on the LED BAR 24 can be in the form of a line.

While the rotation module 20 rotates, the plurality of LEDs 25 mounted on the plurality of LED bars 24 blink and output an image. In this respect, the rotation module 20 can be a display unit.

The display unit can be formed in a circular shape as shown in FIG. 1, or can be formed in a cylindrical shape as shown in FIG. 2. The arrows shown in FIGS. 1 and 2 indicate a direction of rotation, and are shown to rotate clockwise. However, this is an example, and the display unit can rotate counterclockwise.

When the display unit is circular, the plurality of LED bars 24 can be arranged longitudinally in both the rotational direction and the horizontal direction of the plurality of LEDs 25. Specifically, a plurality of LED bars 24 can be spaced apart at predetermined intervals. Additionally, each of the plurality of LED bars 24 can be arranged longitudinally from the center of the rotation module 20 outward.

When the display unit is cylindrical, the plurality of LED bars 24 can be arranged longitudinally in both the rotational direction and the perpendicular direction to the rotation direction of the plurality of LEDs. Specifically, a plurality of LED bars 24 can be arranged to be spaced apart at predetermined intervals and can be arranged longitudinally in the perpendicular direction.

A PCB equipped with LEDs can be installed in each of the plurality of LED bars 24. Each of multiple red LEDs (R) emitting red light, green LEDs (G) emitting green light, and blue LEDs (B) emitting blue light is integrated on the PCB in that order. On the PCB, red LED (R), green LED (G), and blue LED (B) can be arranged in one direction in that order, but depending on the embodiment, red LED (R), green LED (G), and blue LED (B) is considered one LED module, a plurality of LED modules can be arranged along one direction. In this case, the red LEDs (R) belonging to each LED module are arranged along one direction, the green LEDs (G) belonging to each LED module are arranged along one direction, and the blue LEDs belonging to each LED module (B) They can be arranged along one direction.

The present disclosure can be implemented regardless of the type of display unit. That is, the present disclosure can be applied to both a display device having a circular display unit and a display device having a cylindrical display unit.

Meanwhile, in the conventional, image output was controlled by detecting the rotation speed of the rotation module 20, and an infrared sensor or Hall sensor was used to detect the rotation speed.

Next, FIG. 3 is a diagram illustrating a conventional display device equipped with a sensor for detecting rotation speed.

A conventional display device includes a sensor for detecting a rotation speed, and the sensor can include a receiving unit 31 and a transmitting unit 33. One of the receiving unit 31 and the transmitting unit 33 can be disposed on a fixing module 10, and the other can be placed on a rotation module 20. In the example of FIG. 3, it is assumed that the transmitting unit 33 is disposed in the fixing module 10 and the receiving unit 31 is disposed in the rotation module 20, but this is merely an example, and the arrangement could be reversed.

The fixing module 10 can be provided with a supporter 12 that supports the motor 23, etc., and the transmitting unit 33 can be disposed on the supporter 12. Likewise, the rotation module 20 can be provided with a rotation frame 22 supporting a plurality of LED bars 24, and the receiving unit 31 can be disposed on the rotation frame 22. At this time, the transmitting unit 33 and the receiving unit 31 can be arranged to overlap in the vertical direction, and accordingly, the receiving unit 31 can detect a signal transmitted from the transmitting unit 33. Therefore, the display device can calculate the rotation speed through the difference between the nth signal detection time and the n−1th signal detection time.

However, in this case, an error can occur in the output timing calculation due to the speed deviation of the motor 23, etc., and as a result, a problem in which the screen appears to tremble can occur.

Figure 4:
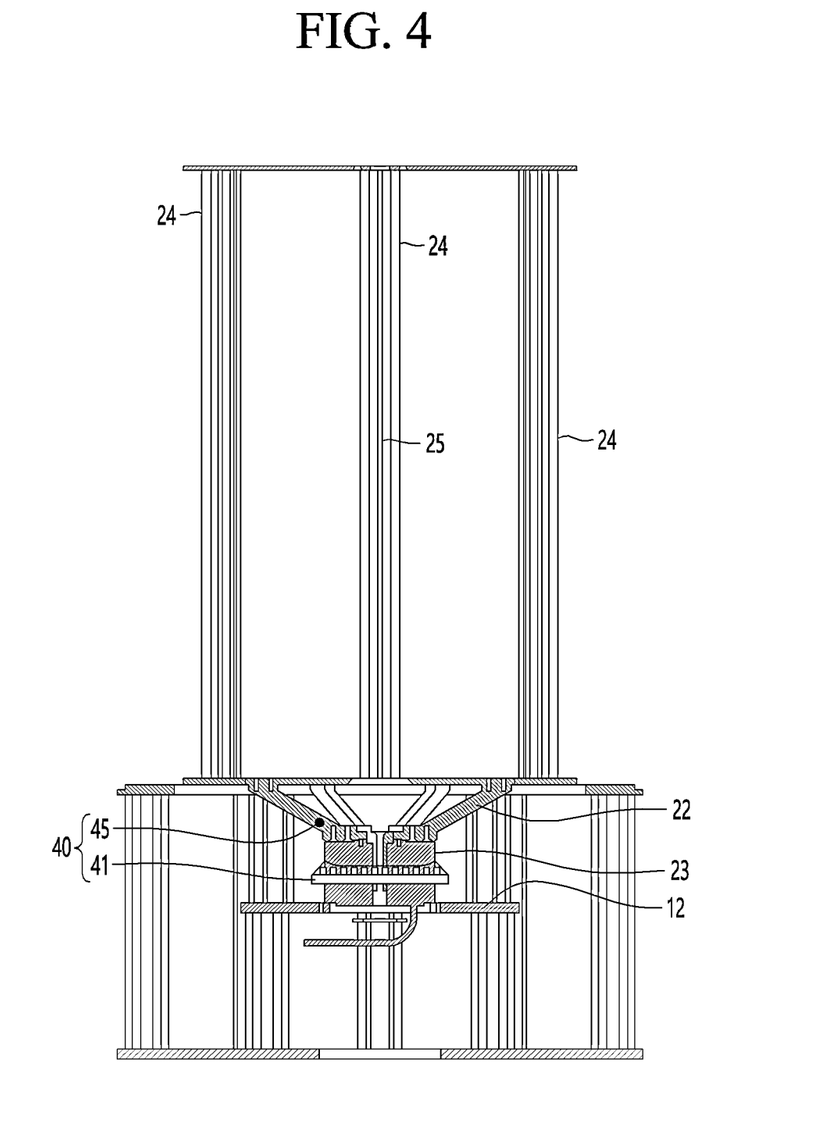
FIG. 4 is a cross-sectional view illustrating a display device according to an embodiment of the present disclosure.

Next, FIG. 4 is a cross-sectional view illustrating a display device according to an embodiment of the present disclosure.

As shown in FIG. 4, a display device according to an embodiment of the present disclosure can include the fixing module 10, the rotation module 20, and a location detection unit 40 can be further included in the display device.

The location detecting unit 40 can detect the locations of the plurality of LEDs 25 according to the rotation of the rotation module 20. The location detecting unit 40 can detect the absolute locations of the plurality of LEDs 25. The location detecting unit 40 can be an encoder.

The location detecting unit 40 can include a scale unit 41 having a recognition object, and a reading unit 45 that calculates the rotation location by detecting the recognition object formed in the scale unit 41. Additionally, the scale unit 41 and the reading unit 45 can be installed separately. In particular, the scale unit 41 can be installed in a fixing module 10, and the reading unit 45 can be installed in a rotation module 20.

The scale unit 41 can be disposed on the outer periphery of at least a portion of the fixing module 10. In the example of FIG. 4, the scale unit 41 is installed along the outer circumference of the motor 23 among the fixing modules 10. However, since this is only an example, it is reasonable that it is not limited thereto. The scale unit 41 can be arranged in other configurations, such as a fixing module 10 and a supporter 12.

In addition, the reading unit 45 can recognize or read the scale unit 41. In particular, the reading unit 45 can recognize the recognition object formed in the scale unit 41. For example, a plurality of recognition objects indicating the location of each horizontal pixel of resolution can be formed in the scale unit 41, and the reading unit 35 can obtain the location of the LED to output by recognizing each of the plurality of recognition objects.

Meanwhile, the recognition objects can vary depending on the embodiment.

Figure 5:
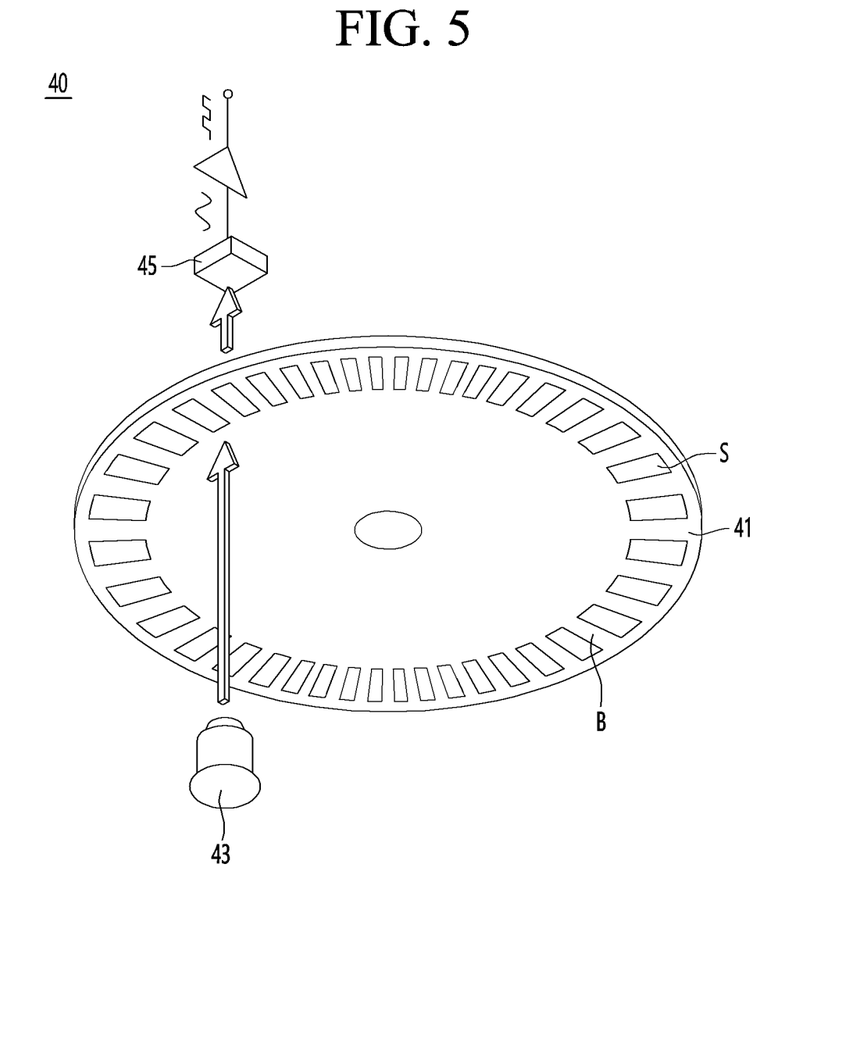
FIG. 5 is an example diagram illustrating a configuration of a location detecting unit according to an embodiment of the present disclosure.

According to one embodiment, and as shown in FIG. 5, a plurality of slits (S) is formed in the scale unit 41, so that the reading unit 45 can recognize light passing through a specific slit.

In particular, FIG. 5 is an example diagram illustrating a configuration of a location detecting unit according to an embodiment of the present disclosure.

As shown in FIG. 5, a plurality of slits (S) can be formed in the scale unit 41. The reading unit 45 can recognize the light passing through the plurality of slits (S) or the light reflecting through the bridge (B) between the slits (S) and the slit (S), thereby detecting the locations of the plurality of rotating LEDs 25. That is, the reading unit 45 can recognize light passing through one of the plurality of slits (S) or recognize light reflected from the bridge (B) between the slits (S).

The number of slits (S) or bridges (B) can be equal to the horizontal number of image resolution. For example, when a display device outputs a Full-HD image (resolution: 1920×1080), the number of slits (S) or bridges (B) can be 1920. Accordingly, the reading unit 45 can detect the location of each of the plurality of LEDs 25 by recognizing the light corresponding to each horizontal pixel.

Alternatively, the number of slits (S) or bridges (B) can be one more than the horizontal number of resolutions of the output image. For example, when a display device outputs a Full-HD image (resolution: 1920×1080), the number of slits (S) or bridges (B) can be 1921 (1920+1). One of these can indicate a reference location, which is the start of one frame of the video. Accordingly, the reading unit 45 can obtain the starting location of the frame through the light corresponding to the slit (S) or bridge (B) indicating the reference location, and through the light corresponding to the remaining slit (S) or bridge (B), the location of each of the plurality of LEDs 25 corresponding to each pixel corresponding to the width of the image can be detected.

In FIG. 5, the location detecting unit 40 is shown to further include a separate light emitting unit 43 and pass through the slit (S), but this is only an example. That is, the reading unit 45 can include a light emitting unit that emits light, and the location of each of the plurality of LEDs 25 can be detected by recognizing the light reflected from the bridge (B).

Next, another type of the location detecting unit 40 will be described.

According to another embodiment, a marker is engraved on the scale unit 41, and the reading unit 45 can include a laser sensor that recognizes a specific marker imprinted on the scale unit 41.

According to another embodiment, at least two locations with different magnetic forces are formed in the scale unit 41, and the reading unit 45 can detect each location of the plurality of LEDs 25 by detecting the magnetic force of the scale unit 41.

Through the various embodiments as described above, the location detecting unit 40 can detect the location of each of the plurality of LEDs 25.

Figure 6:
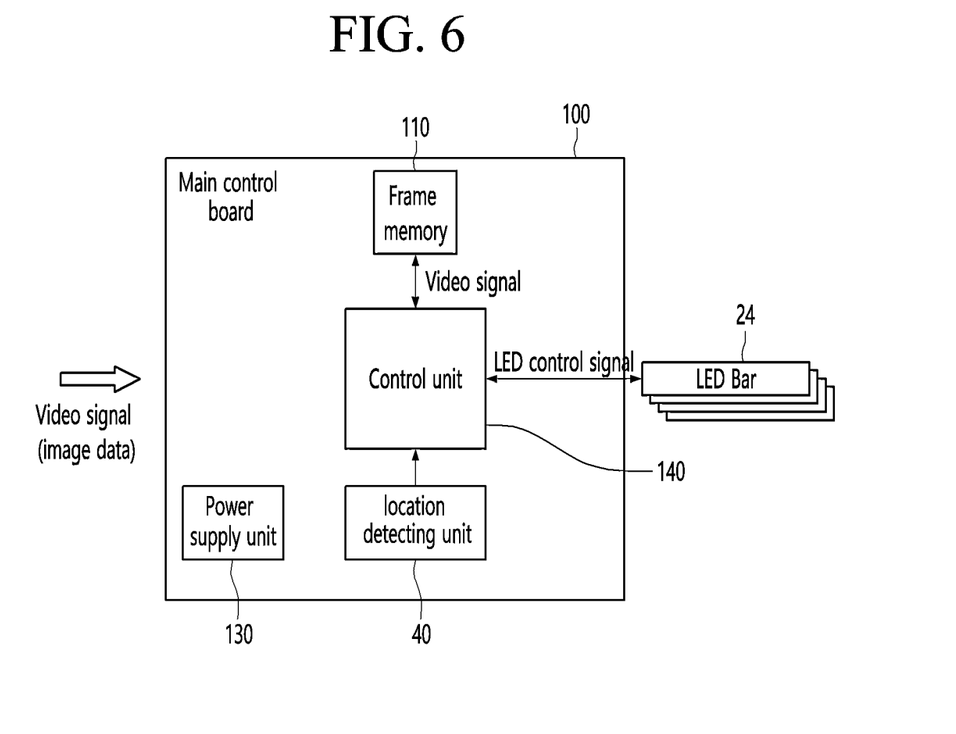
FIG. 6 is a control block diagram of a display device according to an embodiment of the present disclosure.

Next, FIG. 6 is a control block diagram of a display device according to an embodiment of the present disclosure.

The display device can include a main control board 100 including at least part or all of a frame memory 110, a location detecting unit 40, and a power supply unit and a control unit 140.

The power supply unit 130 can supply power to each component of the main control board 100. The power supply unit 130 can receive power directly from an outside or transmit power supplied from the power supply unit provided in the fixing module 10 to each component of the main control board 100.

The frame memory 110 can store image data to be output. The frame memory 110 can store image data in frames. A frame can refer to each still image that makes up the output image.

The control unit 140 can control a plurality of LED bars 24 to output images. The location detecting unit 40 can recognize the rotational location of each of the plurality of LEDs 25 while the plurality of LEDs 25 rotate. The location detecting unit 30 can transmit location information of the LED 25 to the control unit 140. The control unit 140 can receive location information of the plurality of LEDs 25 from the location detecting unit 40.

The control unit 140 can output an image by synchronizing the pixel output locations with the locations of the plurality of LEDs detected through the location detecting unit 40. The pixel output location can refer to the location where each pixel according to image data will be output. That is, the control unit 140 can calculate the absolute locations of the plurality of LEDs 25 and synchronize them to the pixel output locations based on the calculated absolute locations.

Figure 7:
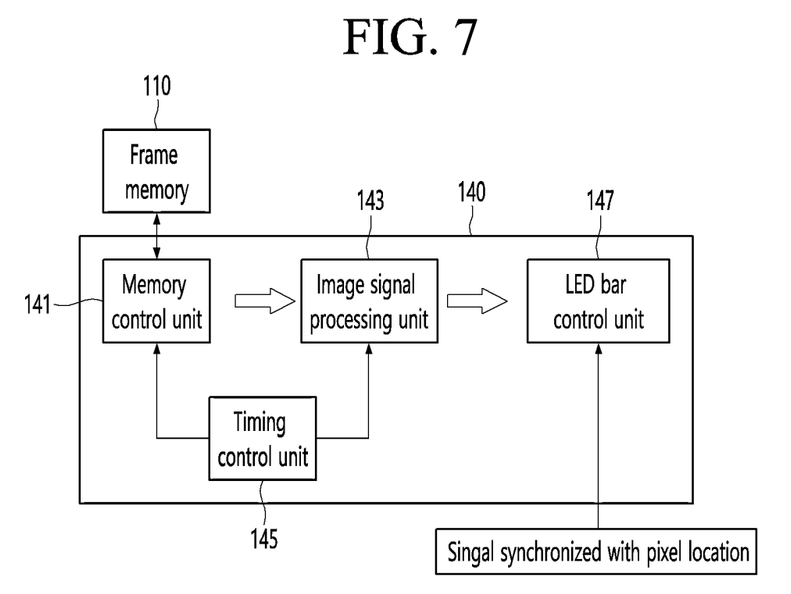
FIG. 7 is a control block diagram illustrating the detailed configuration of a control unit of a display device according to an embodiment of the present disclosure.

FIG. 7 is a control block diagram illustrating the detailed configuration of a control unit of a display device according to an embodiment of the present disclosure.

The control unit 140 can include at least a part or all of a memory control unit 141, an image signal processing unit 143, a timing control unit 145, and an LED bar control unit 147.

The memory control unit 141 can obtain image frames input from the frame memory 110. The timing control unit 145 can obtain the output timing of the image frame. The image signal processing unit 143 can perform signal processing so that the input image frame is output at the output timing.

The LED bar control unit 147 can control the plurality of LEDs 25 to output light according to signal processing. The LED bar control unit 147 can express images by controlling the LEDs integrated in each PCB according to image data.

The LED bar control unit 147 can receive a signal in which the locations of the plurality of LEDs 25 are synchronized to the pixel output location from the location detecting unit 40. The control unit 140 can receive a signal in which the horizontal resolution of the image to be output and the location of the plurality of LEDs 25 are synchronized, and control the LED bar 24 so that the image is output at the corresponding location.

The LED bar control unit 147 can control the plurality of LEDs 25 so that each of the plurality of LEDs 25 outputs light according to the image data at each pixel output location according to the synchronization signal.

That is, the LED bar control unit 147 can transmit an LED control signal to a plurality of LEDs 25 so that each LED 25 outputs light according to image data at each pixel output location.

As shown in FIGS. 6 to 7, according to one embodiment, the control unit 140 can be installed in the rotation module 20 together with the reading unit 45. That is, the control unit 140 is installed on the same board (main control board 100) as the reading unit 45, and accordingly, the control unit 140 can directly receive a synchronization signal from the reading unit 45.

According to another embodiment, the reading unit 45 can be installed in the fixing module 10, and the scale unit 41 can be installed in the rotation module 20. In this case, the display device can further include a communication unit (not shown) that transmits the recognition result by the reading unit 45 to the control unit 140. The communication unit (not shown) can be a slip ring, but this is only an example.

The present disclosure described above can be implemented as computer-readable code on a program-recorded medium. Computer-readable media includes all types of recording devices that store data that can be read by a computer system. Examples of computer-readable media include HDD (Hard Disk Drive), SSD (Solid State Disk), SDD (Silicon Disk Drive), ROM, RAM, CD-ROM, magnetic tape, floppy disk, optical data storage device, etc. Additionally, the computer can include a control unit 170 of a display device 100. Accordingly, the above detailed description should not be construed as restrictive in all respects and should be considered illustrative. The scope of this specification should be determined by reasonable interpretation of the appended claims, and all changes within the equivalent scope of this specification are included in the scope of this specification.

The above description is merely an illustrative explanation of the technical idea of the present invention, and various modifications and variations can be made by those skilled in the art without departing from the essential characteristics of the present invention.

Accordingly, the embodiments disclosed in the present invention are not intended to limit the technical idea of the present invention, but rather to explain it, and the scope of the technical idea of the present invention is not limited by these embodiments.

The scope of protection of the present invention shall be interpreted in accordance with the claims below, and all technical ideas within the equivalent scope shall be construed as being included in the scope of rights of the present invention.

The invention claimed is:

1. A display device comprising:
a fixing module including a motor;
a rotation module including a plurality of light emitting diode (LED) bars equipped with a plurality of LEDs and rotated by the motor;
a control unit configured to control the plurality of LED bars to output an image; and
a location detecting unit configured to detect locations of the plurality of LEDs according to a rotation of the rotation module,
wherein the control unit is configured to output the image by synchronizing pixel output locations with the detected locations of the plurality of LEDs through the location detecting unit,
wherein the location detecting unit includes:
a scale unit installed on the fixing module and including a plurality of slits; and
a reading unit configured to recognize light passing through the plurality of slits or light reflected from a bridge between the plurality of slits to detect the locations of the plurality of LEDs, and
wherein the control unit is further configured to calculate absolute locations of the plurality of LEDs based on the detected locations of the plurality of LEDs and synchronize to the pixel output locations based on the calculated absolute locations.

2. The display device of claim 1,
wherein the reading unit and the scale unit are installed separately.

3. The display device of claim 1, wherein the number of the plurality of slits is equal to horizontal number of an image resolution of the output image.

4. The display device of claim 1, wherein the number of the plurality of slits is one more than a horizontal number of an image resolution of the output image.

5. The display device of claim 1, wherein the scale unit is disposed on an outer periphery of at least a portion of the fixing module.

6. The display device of claim 1, wherein the scale unit is installed along an outer circumference of the motor among the fixing module.

7. The display device of claim 1, wherein the control unit is installed in the rotation module together with the reading unit.

8. The display device of claim 2, further comprising:
a communication unit configured to transmit a result of the recognition by the reading unit to the control unit,
wherein the reading unit is installed in the fixing module and the scale unit is installed in the rotation module.

9. The display device of claim 1, wherein the control unit is configured to receive location information of the locations of the plurality of LEDs from the location detecting unit.

10. The display device of claim 1, wherein the control unit includes:
a memory control unit configured to acquire an input image frame,
a timing control unit configured to obtain output timing of the input image frame,
an image signal processing unit configured to process a signal so that the input image frame is output at the output timing, and
an LED bar control unit configured to control the plurality of LEDs to output light according to the signal processing, and
wherein the LED bar control unit is configured to receive a signal for synchronizing pixel output locations with the locations of the plurality of LEDs from the location detecting unit.

* * * * *